(12) United States Patent
Koinuma et al.

(10) Patent No.: US 7,827,700 B2
(45) Date of Patent: Nov. 9, 2010

(54) METHOD AND JIG FOR DEVICE FOR MEASURING THREE-DIMENSIONAL SHAPE OF CONNECTION ASSEMBLY OF STATOR COIL IN TURBINE GENERATOR

(75) Inventors: Hiroaki Koinuma, Yokohama (JP); Kazuyuki Sasaki, Yokohama (JP); Yuichiro Gunji, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/632,610

(22) Filed: Dec. 7, 2009

(65) Prior Publication Data

US 2010/0139107 A1    Jun. 10, 2010

(30) Foreign Application Priority Data

Dec. 9, 2008    (JP)    ............................. 2008-313557
Oct. 19, 2009    (JP)    ............................. 2009-240598

(51) Int. Cl.
  *G01B 5/20*    (2006.01)
  *G01B 11/24*    (2006.01)
(52) U.S. Cl. .......................................... 33/503; 33/551
(58) Field of Classification Search ................. 33/503, 33/551, 553, 554–556, 558–559, 561, 1 M, 33/1 N, 1 PT
See application file for complete search history.

(56) References Cited

U.S. PATENT DOCUMENTS

| | | | | |
|---|---|---|---|---|
| 5,361,027 A | * | 11/1994 | Selleri | ........................... 33/549 |
| 6,163,973 A | * | 12/2000 | Matsumiya et al. | ............ 33/559 |
| 6,633,143 B2 | * | 10/2003 | Weston et al. | .................. 33/503 |
| 6,810,597 B2 | * | 11/2004 | Grzesiak et al. | ............... 33/503 |
| 7,490,413 B2 | * | 2/2009 | Liu et al. | ........................ 33/552 |
| 7,503,125 B2 | * | 3/2009 | Jordil et al. | .................... 33/503 |
| 7,520,067 B2 | * | 4/2009 | Yoshizumi et al. | ............. 33/561 |
| 2007/0266574 A1 | * | 11/2007 | Ikeuchi et al. | .................. 33/267 |
| 2008/0072442 A1 | * | 3/2008 | Liu et al. | ....................... 33/502 |
| 2008/0216336 A1 | * | 9/2008 | Wood et al. | .................... 33/551 |
| 2008/0271332 A1 | * | 11/2008 | Jordil et al. | .................... 33/503 |

FOREIGN PATENT DOCUMENTS

JP    2006-109325    4/2006
JP    2007-278995    10/2007

* cited by examiner

*Primary Examiner*—Yaritza Guadalupe-McCall
(74) *Attorney, Agent, or Firm*—Ohlandt, Greeley, Ruggiero & Perle, L.L.P.

(57) ABSTRACT

A method of measuring a three-dimensional shape of a connection assembly of a stator coil in a turbine generator, includes first measuring a three-dimensional shape of a measurement area of the connection assembly of the stator coil in a measurement range set in advance by a laser non-contact three-dimensional shape measurement device, second measuring a three-dimensional shape of a measurement area of the connection assembly of the stator coil in a measurement range set in advance by a multi-joint contact three-dimensional shape measurement device, the multi-joint contact three-dimensional shape measurement device including a plurality of arms being coupled via a joint including a built-in encoder, and integrally synthesizing the three-dimensional shape data measured in the first measurement, the three-dimensional shape data measured in the second measurement, and shape measurement data of a local area measured manually, thereby drafting a plan of the stator connection assembly.

12 Claims, 18 Drawing Sheets

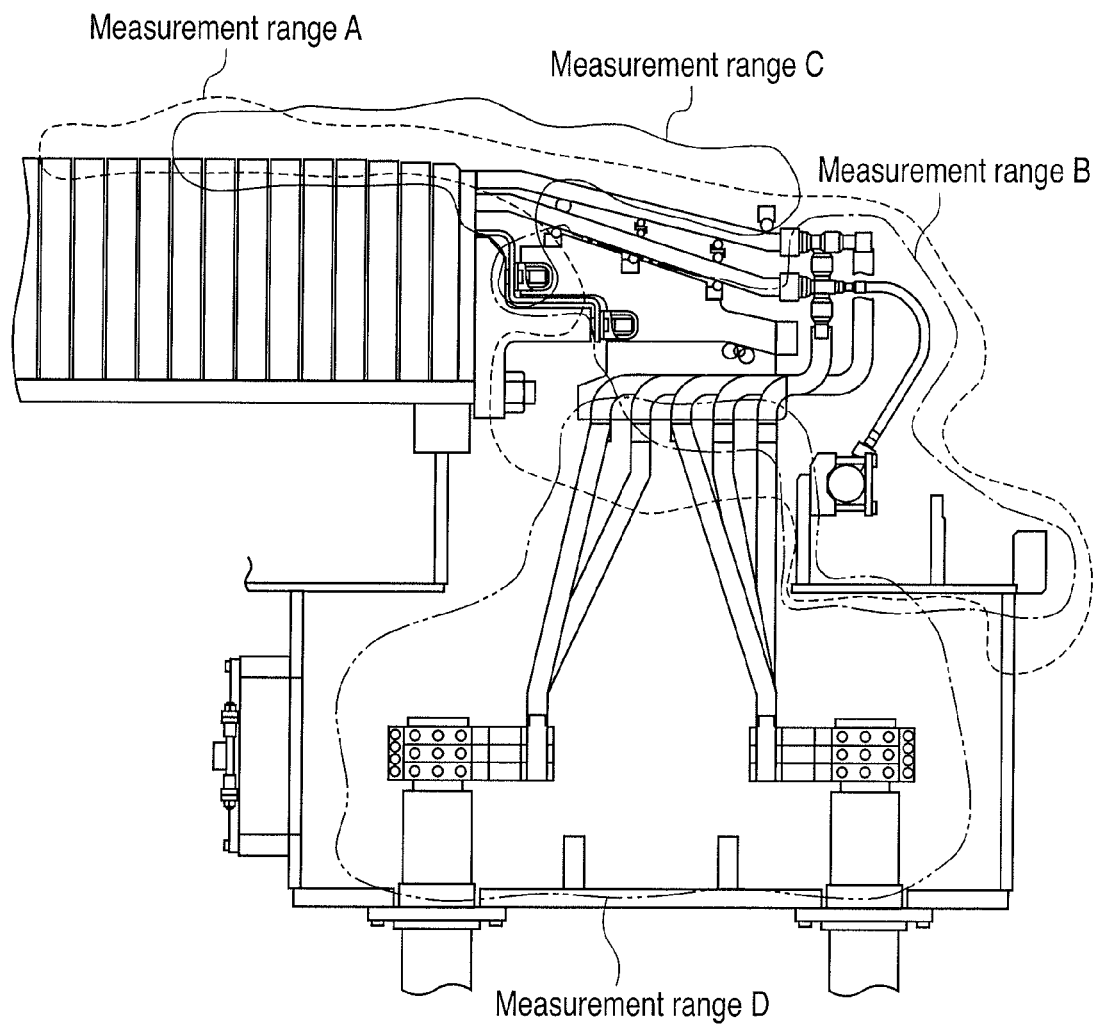
F I G. 4

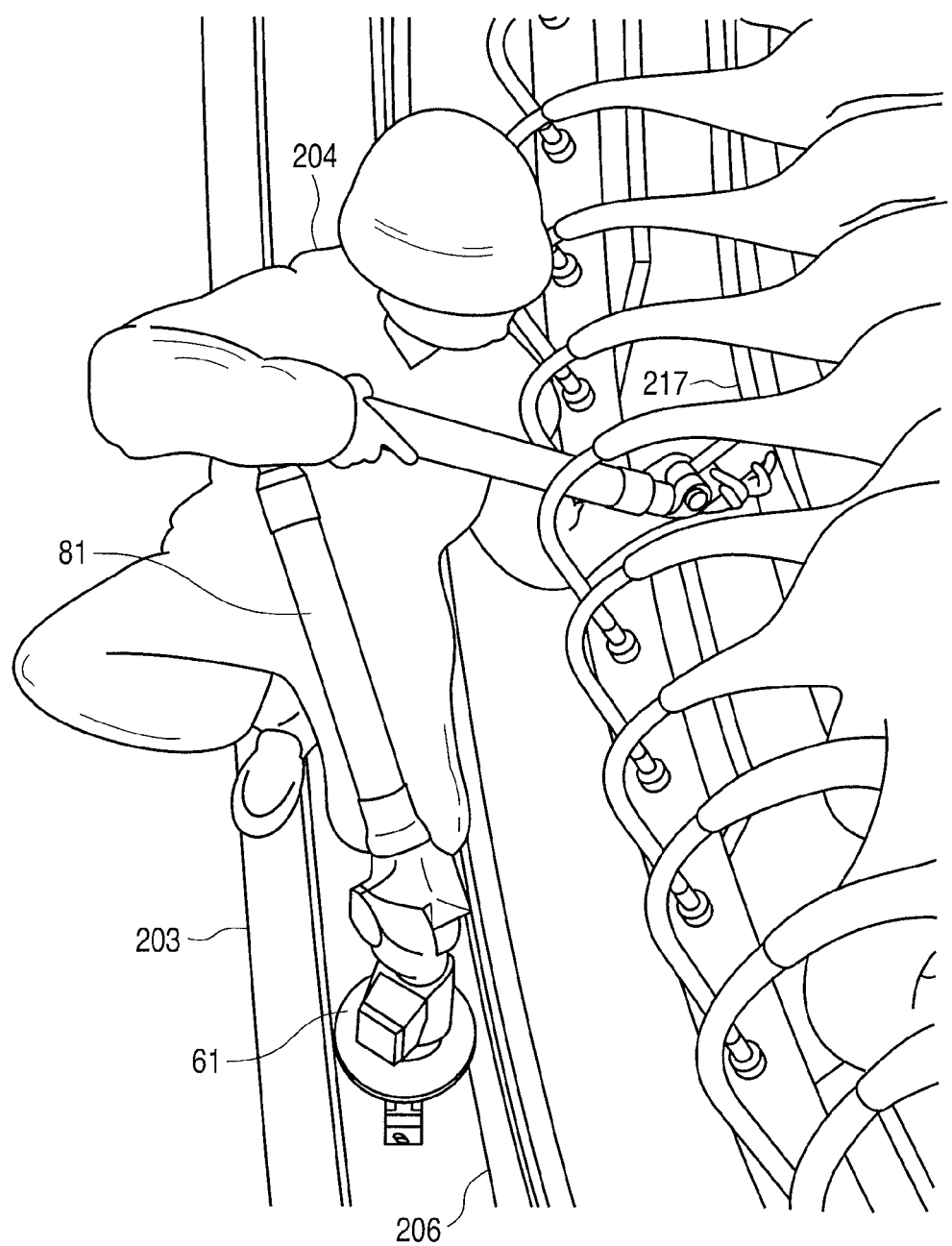
F I G. 9

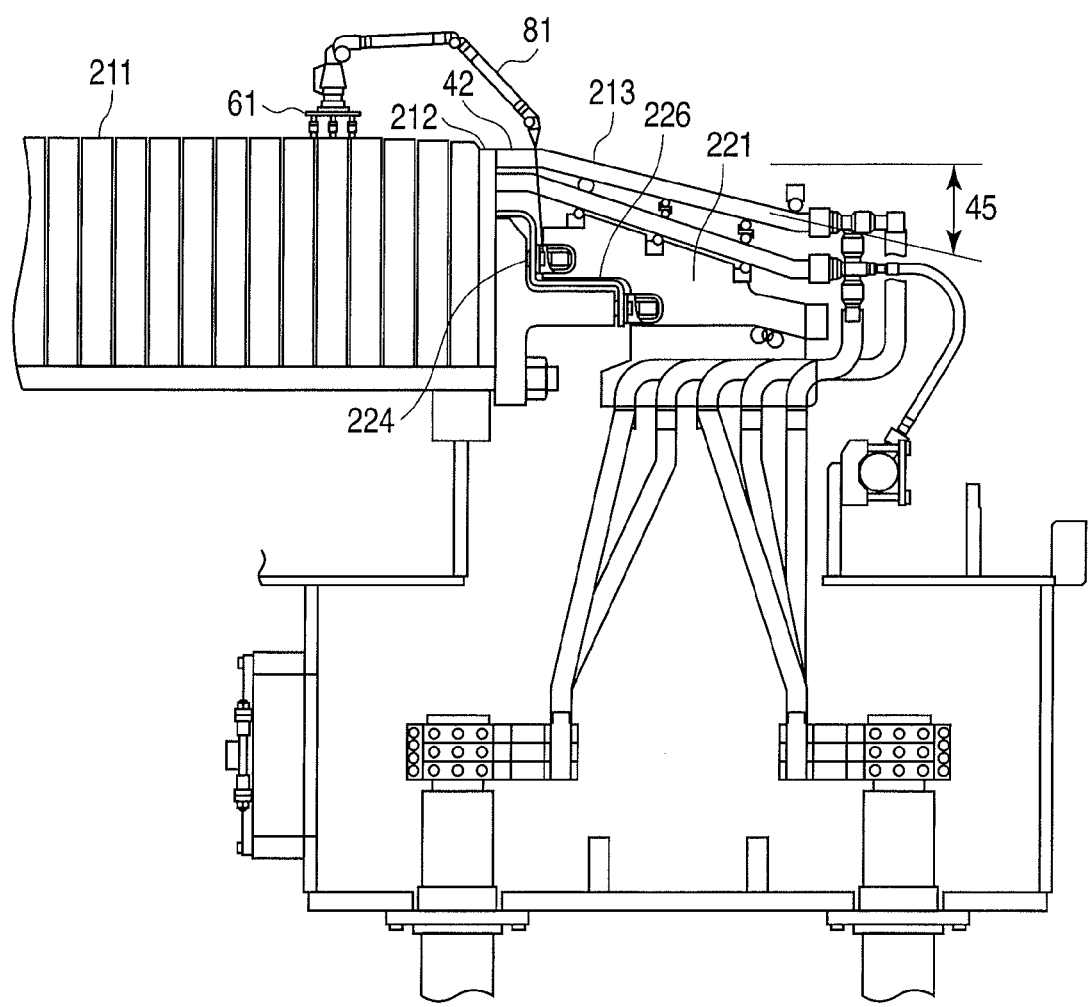
F I G. 13

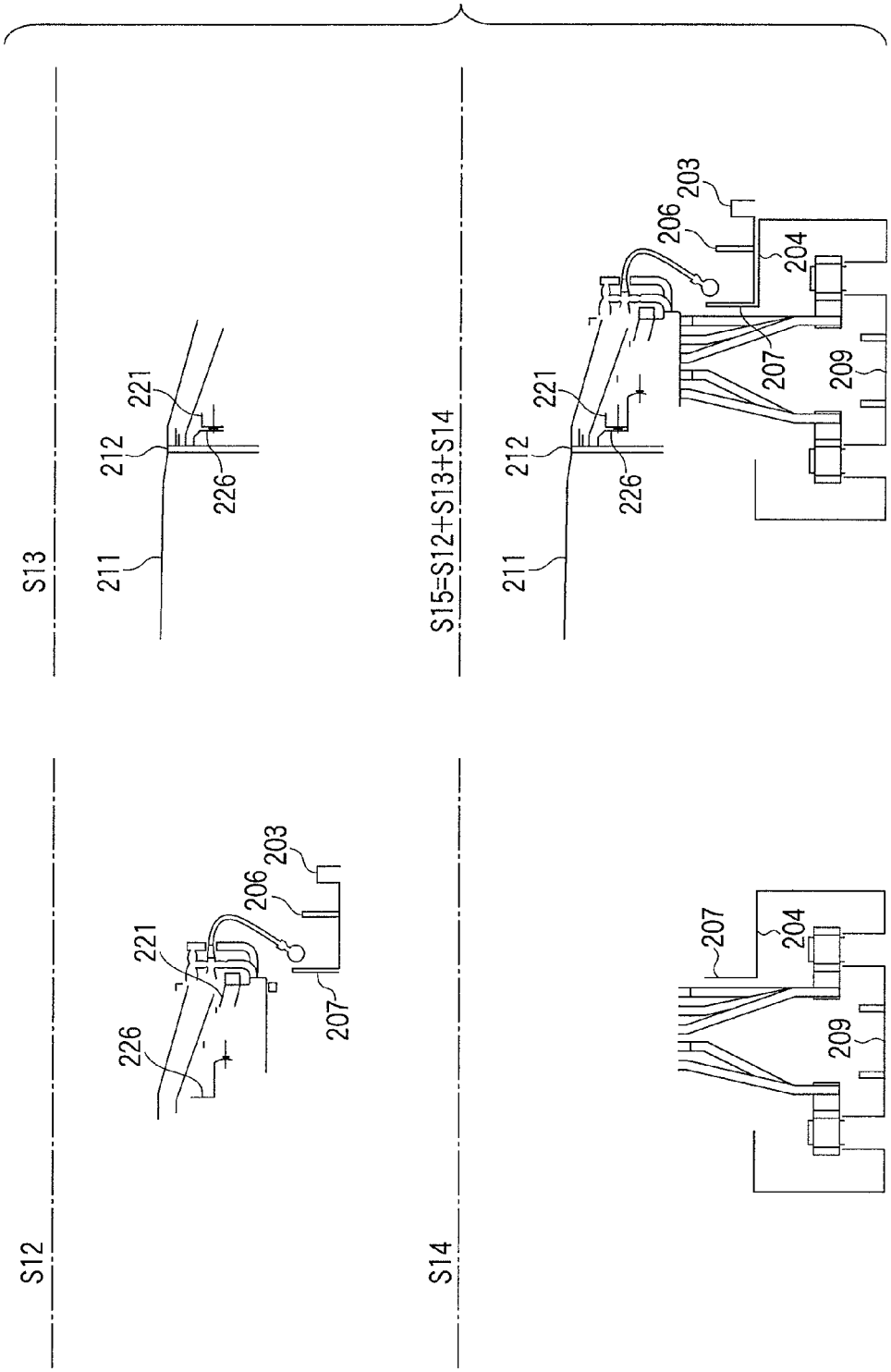

METHOD AND JIG FOR DEVICE FOR MEASURING THREE-DIMENSIONAL SHAPE OF CONNECTION ASSEMBLY OF STATOR COIL IN TURBINE GENERATOR

CROSS-REFERENCE TO RELATED APPLICATIONS

This application is based upon and claims the benefit of priority from prior Japanese Patent Applications No. 2008-313557, filed Dec. 9, 2008; and No. 2009-240598, filed Oct. 19, 2009, the entire contents of both of which are incorporated herein by reference.

BACKGROUND OF THE INVENTION

1. Field of the Invention

The present invention relates to a method and a jig for a device for measuring a three-dimensional shape of a connection assembly of a stator coil in a turbine generator, and generating CAD data for use for connection assembling of the stator coil based on the measured information.

2. Description of the Related Art

Since a stator coil in a turbine generator deteriorates in electric insulation or the like with time, the stator coil is regularly rewound in the field.

This work requires a connection assembly drawing of the stator coil. Since connection assembly drawings of stator coils other than those of in-house stator coils are not available, orders of only in-house stator coils have been accepted. By reversely drafting a plan from shape measurement data of an actual product (reverse engineering), however, stator coils of other companies can also be rewound even without drawings.

Methods and devices of measuring a three-dimensional shape for reverse engineering include those targeted for rotors of turbine generators (see Jpn. Pat. Appln. KOKAI Publication No. 2007-278995).

The method and device of measuring a three-dimensional shape disclosed therein can be applied to a rotor having a relatively simple shape, but cannot be applied directly to the case where the target is a connection assembly of a stator coil in a turbine generator.

At the time of measurement of a surface shape of an actual stator coil assembly having a complicated structure and a small machining surface suitable for measurement, in both of the coil ends of the turbine side and the collector side, in particular, manual measurement schemes using vernier calipers or micrometers have been adopted.

Although such schemes are suitable for measurement of local areas, the other areas are difficult to measure physically due to the limitation by large-diameter parts, space, and so forth. Further, at the time of measurement of parts on a pitch circle or relative dimensions such as bolt arrangement, the number of items to be measured increases and the measurement deteriorates in precision.

BRIEF SUMMARY OF THE INVENTION

Accordingly, it is an object of the present invention to provide a method and a jig for a device for measuring a three-dimensional shape of a connection assembly of a stator coil in a turbine generator, capable of measuring the surface shape with ease and with high precision, by using both a laser non-contact three-dimensional shape measurement device and a multi-joint contact three-dimensional shape measurement device which are capable of obtaining coordinate information of the surface shape of the stator coil connection assembly in a CAD data format or the like.

According to one aspect of the present invention, there is provided a method of measuring a three-dimensional shape of a connection assembly of a stator coil in a turbine generator, the turbine generator including: the stator coil contained in a slot provided in a stator core and penetrating the stator core in an axial direction; a terminal box provided in correspondence with a coil end portion of the stator coil; a header casing pipe connected to the coil end; a mounting plate configured to mount an end shield; and an end plate configured to mount a bearing bracket, the header casing pipe, the mounting plate, and the bearing bracket being mounted on an outer peripheral plate of a stator frame forming the terminal box, the method comprising: first measuring a three-dimensional shape of a measurement area of the connection assembly of the stator coil in a measurement range set in advance by a laser non-contact three-dimensional shape measurement device; second measuring a three-dimensional shape of a measurement area of the connection assembly of the stator coil in a measurement range set in advance by a multi-joint contact three-dimensional shape measurement device, the multi-joint contact three-dimensional shape measurement device including a plurality of arms being coupled via a joint including a built-in encoder; and integrally synthesizing the three-dimensional shape data measured in the first measurement, the three-dimensional shape data measured in the second measurement, and shape measurement data of a local area measured manually, thereby drafting a plan of the stator connection assembly.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 4 illustrates an example of a measurement range of a connection assembly of a stator coil, measured by a three-dimensional shape measurement device, according to a method of measuring a three-dimensional shape of a connection assembly of a stator coil of the present invention;

FIG. 9 illustrates a second measurement example by a multi-joint contact three-dimensional shape measurement device secured to an inner diameter surface of an outer peripheral plate using a magnet jig according to the embodiment;

FIG. 13 illustrates a first measurement example by a multi-joint contact three-dimensional shape measurement device secured to an inner diameter surface of a stator core using a magnet jig according to the embodiment;

FIG. 19 illustrates examples of a standard coordinate system and a common element used in the three-dimensional shape measurement.

DETAILED DESCRIPTION OF THE INVENTION

Hereinafter, a three-dimensional shape measurement method of a connection assembly of a stator coil in a turbine generator according to an embodiment of the present invention will be described with reference to the accompanying drawing.

First, a connection assembly of a stator coil in a turbine generator will be described.

Figure 1:
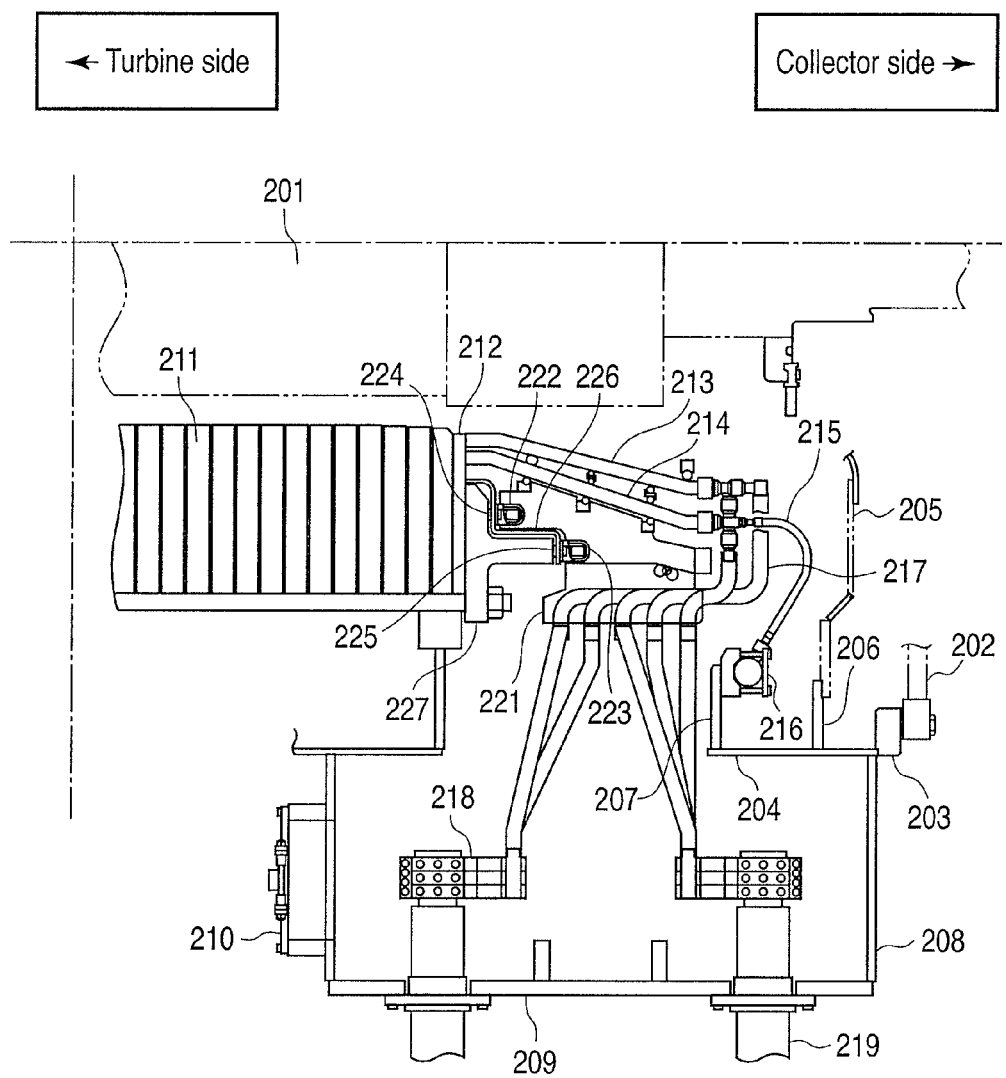
FIG. 1 is a connection assembly drawing of a stator coil in a turbine generator, which is a target of measurement according to the present invention.

FIG. 1 is a connection assembly drawing of a stator coil, wherein a stator core 211 is arranged with an appropriate space to surround an outer periphery around a rotor 201. A plurality of slots penetrating the stator core 211 in the axial direction are provided at even intervals at the inner peripheral side of the stator core 211. An upper coil 213 and a lower coil 214 are included in each of the slots as two layers.

A stator flange 227 is arranged via an outer space block 212 on both end faces of the stator core 211, and is bolted.

A coil end lower structure including an upper coil 213 and a lower coil 214, lead outside via the outer space block 212 from the both end faces (only one of which is shown in the drawing) of the stator core 211, is supported by a bind ring support 221. The bind ring support 221 is assembled by being secured to the stator flange 227 by bind-ring-support mounting bolts 224, 225 via bind ring support mounts 222, 223 and a shield plate 226.

A terminal box 208 is provided in correspondence with the coil end and attached to a frame of the stator core. On a side surface of the terminal box 208, a manhole 210 for mounting and demounting devices is provided. The manhole 210 is normally blocked by a lid body. Inside the terminal box 208, a connection copper ring/bar 217 connected to coil ends of the upper coil 213 and the lower coil 214 is arranged. The connection copper ring/bar 217 is connected to a bushing connector 218 provided at an inner end of a high voltage bushing 219 mounted to penetrate a bottom plate 209 of the terminal box 208.

On an outer peripheral plate 204 of a stator frame forming the terminal box 208, a header casing pipe 216 for letting the coolant flows is connected to the coil ends of the upper coil 213 and the lower coil 214 via an insulation connection hose 215. Further, an end-shield mounting plate 206 for mounting an end shield 205, and an end plate 203 for mounting a bearing bracket 202 are also mounted.

In the present invention, the measurement range suitable for measurement by a laser non-contact three-dimensional shape measurement device and the measurement range suitable for measurement by a multi-joint contact three-dimensional shape measurement device are set, according to a measurement area in the connection assembly of the stator coil in the turbine generator with the above-described configuration. Further, a surface shape measurement is manually performed for measurement areas which are difficult to measure by the above-described three-dimensional shape measurement devices. Moreover, measurement data of the measurement ranges are integrally combined to create a plan of the connection assembly of the overall stator coil.

The laser non-contact three-dimensional shape measurement device is configured to measure the top surface shape and the inner surface shape of parts in which the measurement areas are viewable directly from outside the stator coil connection assembly.

The multi-joint contact three-dimensional shape measurement device bendably couples a plurality of arms via a joint (axis) including a built-in encoder (rotation position detection sensor). Further, the multi-joint contact three-dimensional shape measurement device includes a probe for obtaining three-dimensional coordinates around a ball on the tip, and is configured to obtain three-dimensional coordinate information from an amount of change and an arm length between joints at the time of movement of a ball provided at the tip of the probe while keeping the ball in contact with the measurement target. This measurement can be performed with respect to elements of circles, line, planes, cylinders, and cones.

In this case, a probe extension can be added to the probe tip, or a flexural probe can be attached instead of a linear probe, as necessary. The length of a probe tip when a probe extension is added can be recognized by the correction at the time of start of measurement.

In the multi-joint contact three-dimensional shape measurement device with the above-described configuration, when areas which are physically difficult to access directly, such as the area from the inside of the connection assembly of the stator coil to the lower portion of the coil end, the origin of coordinates must not be misaligned.

Therefore, in the present invention, by mounting an exclusive magnet or clamping jig to the multi-joint contact three-dimensional shape measurement device, the origin of coordinates can be secured so as not to be misaligned, and areas which are difficult to access directly can be measured.

A magnet jig is preferable for a case where the arm tip is movably secured to the inside of the stator coil connection assembly, such as the inner diameter surface of the outer peripheral plate and the inner diameter surface of the stator core. The clamping jig is preferable for a case where the arm tip is secured to the inside of the stator coil connection assembly such as an inner diameter surface of the end-shield mounting plate, and the upper reinforcing portion of the bottom plate of the terminal box.

Figure 2:
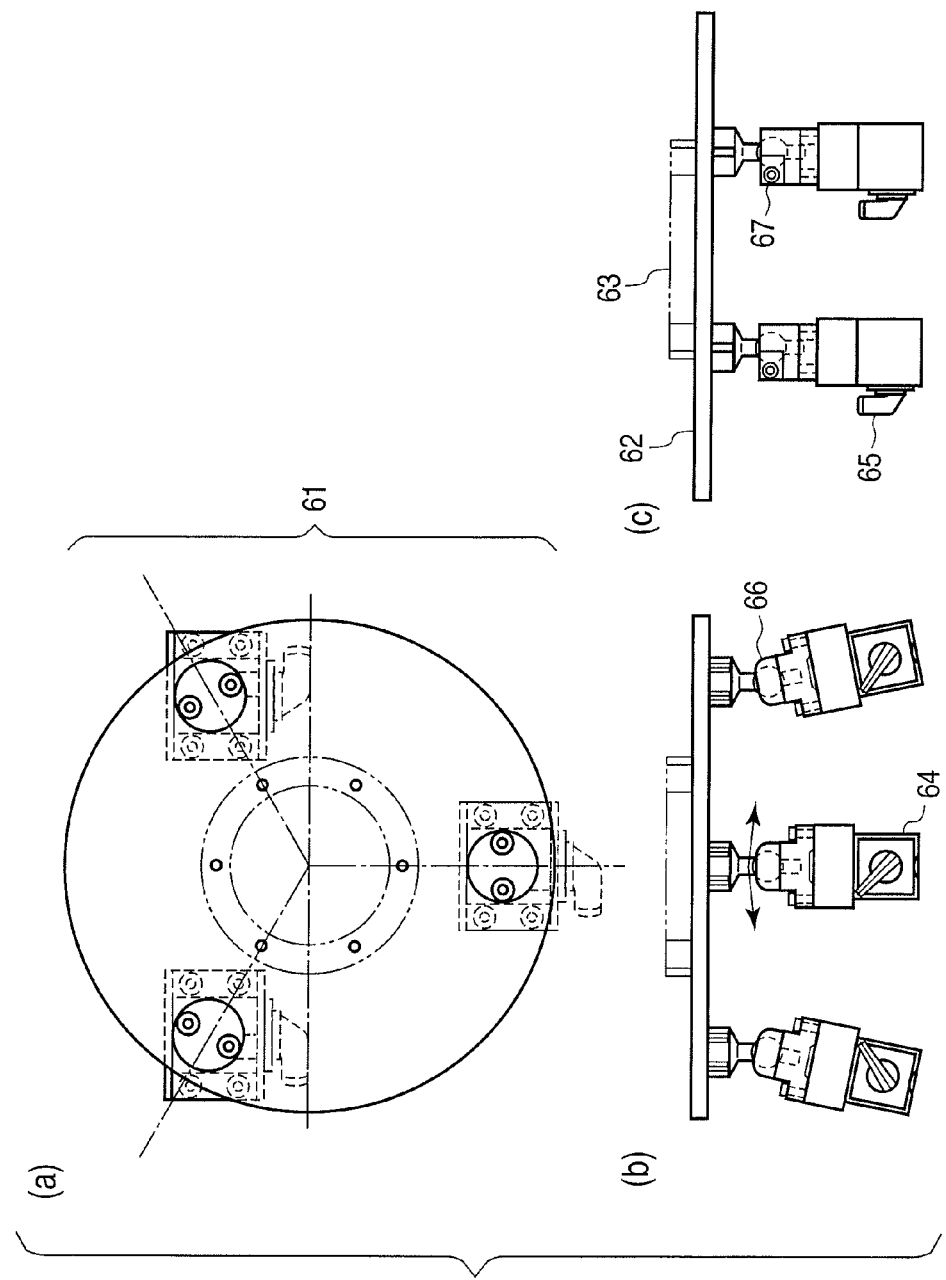
FIG. 2 illustrate a magnet jig for a multi-joint contact three-dimensional shape measurement device used in the present invention, wherein (a) is a plan view, (b) is a front view, and (c) is a side view.

FIGS. 2 (a)-(c) illustrate a magnet jig 61 for the multi-joint contact three-dimensional shape measurement device, wherein (a) is a plan view, (b) is a front view, and (c) is a side view.

As shown in FIG. 2 (a)-(c), a mount ring 63, on an outer diameter surface of which threads are cut, is provided in a central part of an upper surface of a pedestal 62. The multi-joint contact three-dimensional shape measurement device is attached to the mount ring 63 by engaging a screw part formed on the secured end.

A plurality of (three in the drawing) magnet bases 64 are mounted at even intervals via a movable ball joint 66 in a lower surface peripheral part of the pedestal 62. In this case, the magnet base 64 includes a setscrew 67 for holding the state in which the movable ball joint 66 is adjusted, and a knob 65 for turning on and off the adsorption power by the magnet built into the magnet base 64, so as to secure stable installation even if the securing is made to a curved surface part such as the inner diameter surface.

Figure 3:
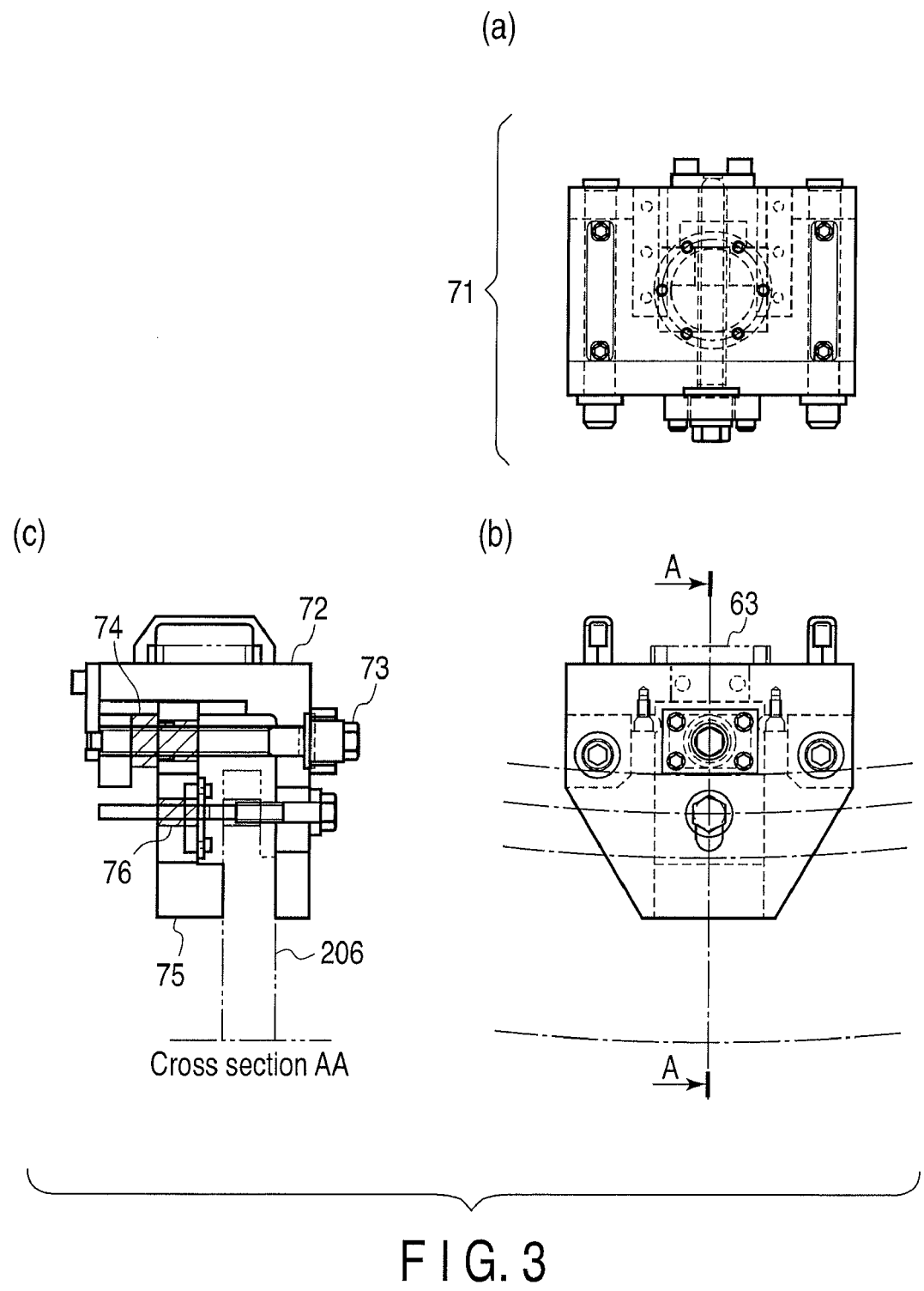
FIG. 3 illustrate a clamping jig for a multi-joint contact three-dimensional shape measurement device used in the present invention, wherein (a) is a plan view, (b) is a front view, and (c) is a cross-sectional view along line A-A of (b)

FIG. 3 (a)-(c) illustrate a clamping jig 71 for the multi-joint contact three-dimensional shape measurement device, wherein (a) is a plan view, (b) is a front view, and (c) is a cross-sectional view along the line A-A of (b).

As shown in FIG. 3 (a)-(c), a mount ring 63, on an outer diameter surface of which threads are cut, is provided in a central part of the upper surface of a main body 72 having an inverted L-shaped section. The multi-joint contact three-dimensional shape measurement device is attached by engaging a screw part formed on the secured end in the mount ring 63.

In a rear space part facing a front plate of the inverted L-shaped body 72, a back plate 75 is provided. By inserting a clamping screw 73 inserted to penetrate the front plate of the body 72 toward an internal thread 74 pressed into an aperture provided to penetrate an upper part of the back plate 75, and turning the clamping screw 73 in a clamping direction or a direction opposite thereto, the back plate 75 is movable in parallel in a direction toward or away from the front plate.

Accordingly, by interposing the end-shield mounting plate 206, for example, between the front plate and the back plate 75 of the main body 72, and tightening the clamping screw 73, the end-shield mounting plate 206 is clamped. In this case, the jig includes an anti-fall retaining pin mechanism 76, which is inserted in a screw aperture of the end-shield mounting plate 206, for example.

The clamping jig 71 with the above-described configuration can be secured in the proximity of the part directly under the multi-joint contact three-dimensional shape measurement device in the vertical direction but also at the right or left side in the horizontal direction, and can be used in a wider range than the above-described magnet jig.

Next, descriptions will be made about a method of measuring a three-dimensional shape of a connection assembly of a stator coil using the laser non-contact three-dimensional shape measurement device and the multi-joint contact three-dimensional shape measurement device to which the magnet jig or the clamping jig is attached. First, a measurement range of a stator coil connection assembly measured by each of the three-dimensional shape measurement devices will be described.

FIG. 4 illustrates measurement ranges A-D of a connection assembly of a stator coil measured by each of the three-dimensional shape measurement devices.

In FIG. 4, a measurement range A is a range where the laser non-contact three-dimensional shape measurement device measures an area which is viewable directly from outside the stator coil connection assembly. Measurement range B is a range where the multi-joint contact three-dimensional shape measurement device measures an area mainly from the end plate to the lower portion of the coil end of the stator coil connection assembly. Measurement range C is a range where the multi-joint contact three-dimensional shape measurement device measures an area mainly from the stator core to the lower portion of the coil end of the stator coil connection assembly. Measurement range D is a range where the multi-joint contact three-dimensional shape measurement device measures an area mainly from the terminal box to the lower portion of the coil end of the stator coil connection assembly.

At the time of measurement, a rotor 201, shown in FIG. 2 by the two-dot chain lines, the bearing bracket 202, and the end shield 205 need to be dismantled in advance before the measurement.

Hereinafter, a method of measuring a three-dimensional shape of a stator coil connection assembly will be described with reference to the flowchart shown in FIG. 5.

Figure 5:
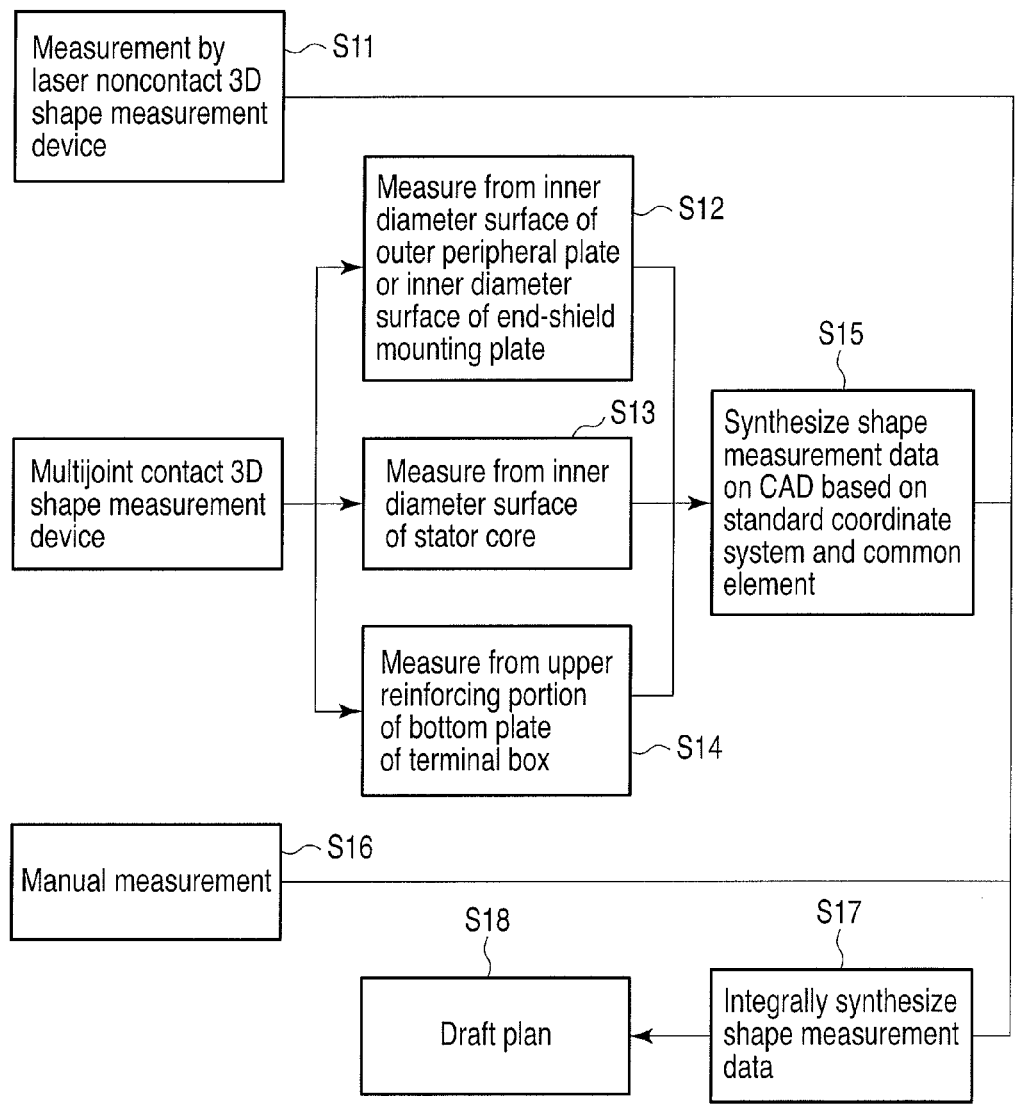
FIG. 5 is a flowchart illustrating an embodiment of a method of measuring a three-dimensional shape of a connection assembly of a stator coil in a turbine generator according to the present invention.

Step S11 shown in FIG. 5 is a measurement step of the laser non-contact three-dimensional shape measurement device. More specifically, measurement step S11 is performed as will be described below.

Figure 6:
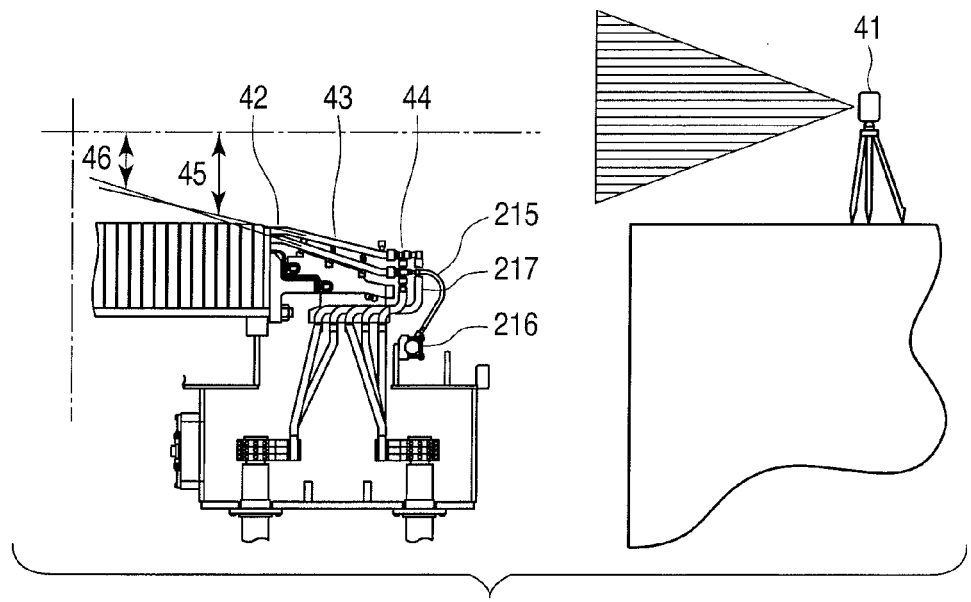
FIG. 6 illustrates a first measurement example by a laser non-contact three-dimensional shape measurement device according to the embodiment.
Figure 7:
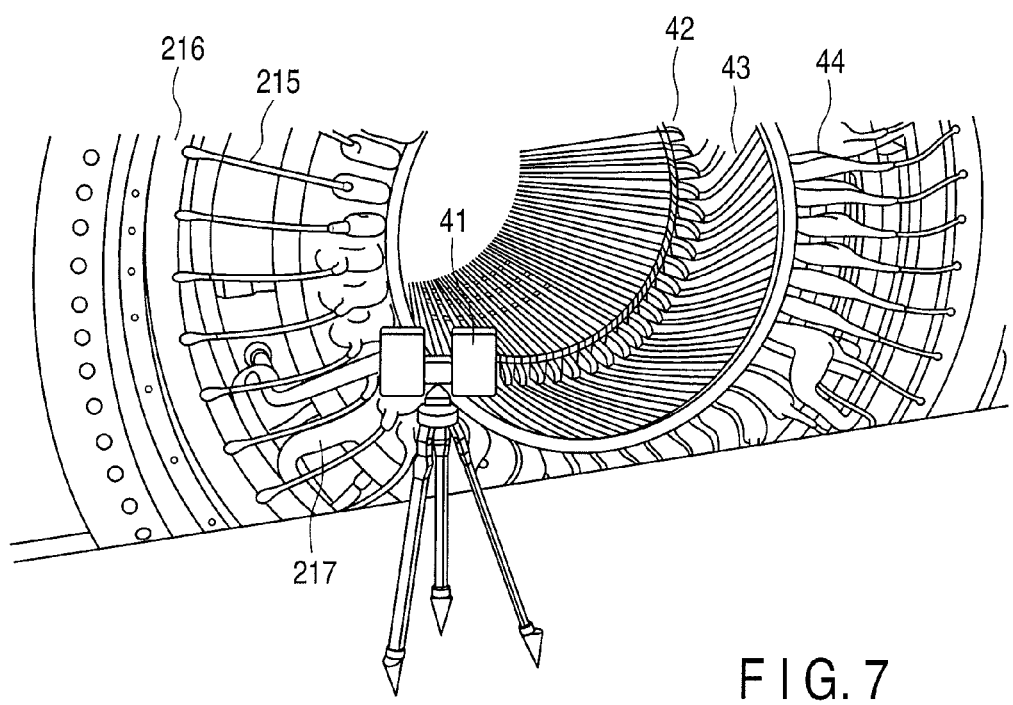
FIG. 7 illustrates a second measurement example by a laser non-contact three-dimensional shape measurement device according to the embodiment.

FIGS. 6 and 7 illustrate measurement examples of the measurement range A measured by the laser non-contact three-dimensional shape measurement device.

As shown in FIGS. 6 and 7, the laser non-contact three-dimensional shape measurement device 41 is secured to a surface of a floor outside the stator coil connection assembly with a tripod, for example. The laser non-contact three-dimensional shape measurement device 41 measures arrangement, for example, of an area which is viewable directly from the secured position, such as a coil involute part 43, mainly from a coil core end 42 to a coil series part 44, and coil angles 45, 46, an insulation connection hose 215, and a header casing pipe 216, and a connection copper ring/bar 217. The measured data is stored in a memory, not shown, as point group data.

Steps S12, S13 and S14 shown in FIG. 5 are measurement steps performed by the multi-joint contact three-dimensional shape measurement device. Step S12 is a measurement step from the inner diameter surface of the outer peripheral plate or the inner diameter surface of the end-shield mounting plate. More specifically, steps S12, S13, and S14 are performed as will be described below.

Figure 8:
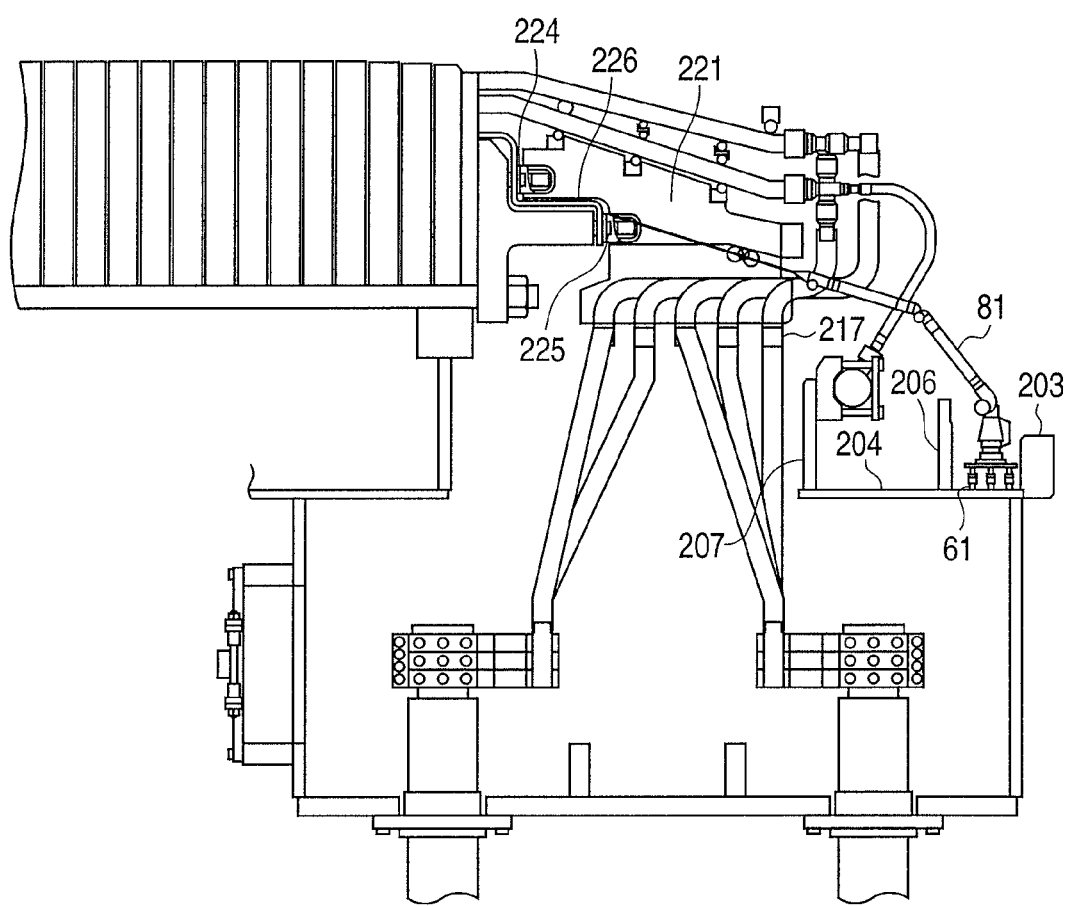
FIG. 8 illustrates a first measurement example by a multi-joint contact three-dimensional shape measurement device secured to an inner diameter surface of an outer peripheral plate using a magnet jig according to the embodiment.

FIGS. 8 and 9 illustrate a measurement example of measurement range B by the multi-joint contact three-dimensional shape measurement device 81, which is secured to the inner diameter surface of the outer peripheral plate 204 by attaching the magnet jig 61 (shown in FIG. 2).

In FIGS. 8 and 9, the multi-joint contact three-dimensional shape measurement device 81 mainly measures an area such as a bind ring support 221, bind-ring-support mounting bolts 224, 225, a connection copper ring/bar 217, and various lower structures of the coil end, and the measured data is stored in a memory, not shown.

In this case, as shown in the drawing associated with "S12" in FIG. 19, a standard coordinate system and a common element are taken by assuming a predetermined portion on the end plate 203 or the end-shield mounting plate 206 as a diameter center and predetermined portions on the bind ring support 221, the shield plate 226, the partition plate 207, and the like as a three-dimensional axis.

In the above-described case, the measurement is performed from the inner diameter surface of the outer peripheral plate. When the measurement is performed from the inner diameter surface of the end-shield mounting plate, measurement range B can be measured by the multi-joint contact three-dimensional shape measurement device 81 by attaching the clamping jig 71 (as shown in FIG. 3) and securing the jig to the inner diameter surface of the end-shield mounting plate 206.

Figure 10:
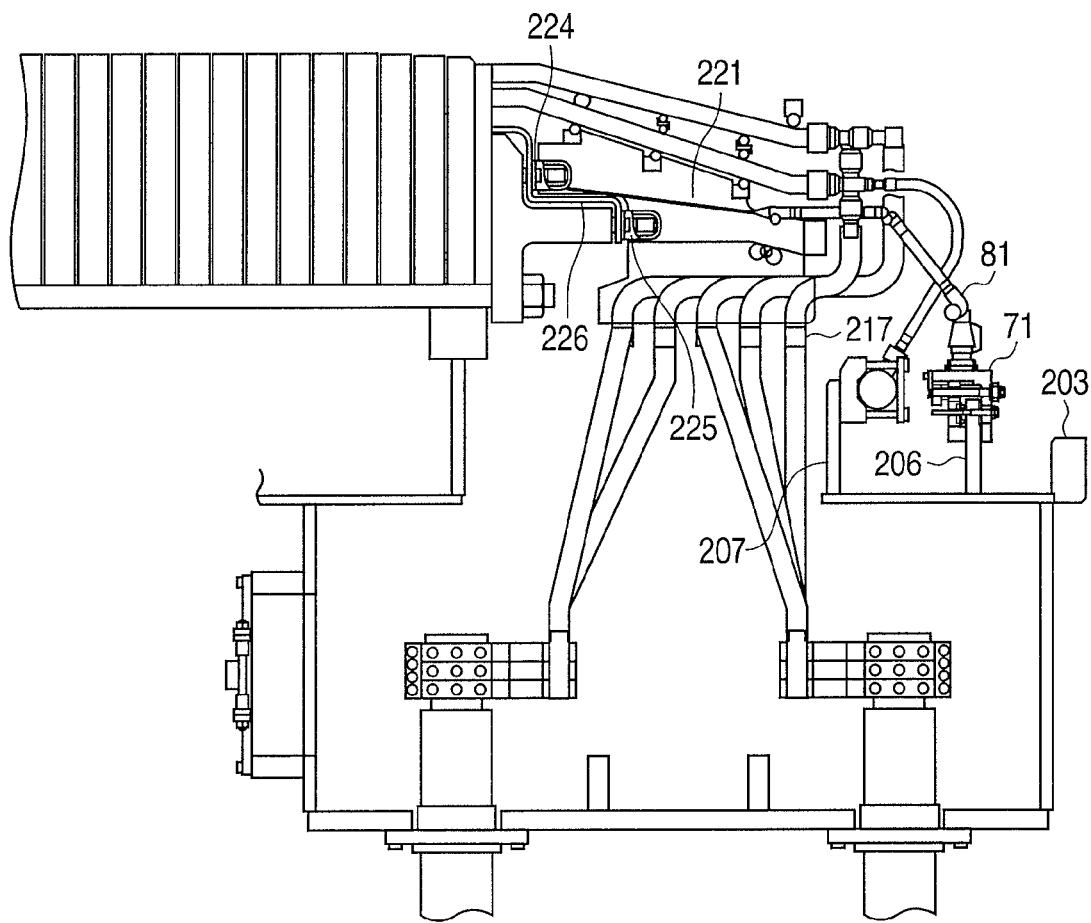
FIG. 10 illustrates a first measurement example by a multi-joint contact three-dimensional shape measurement device secured to an inner diameter surface of an end-shield mounting plate using a clamping jig according to the embodiment.
Figure 11:
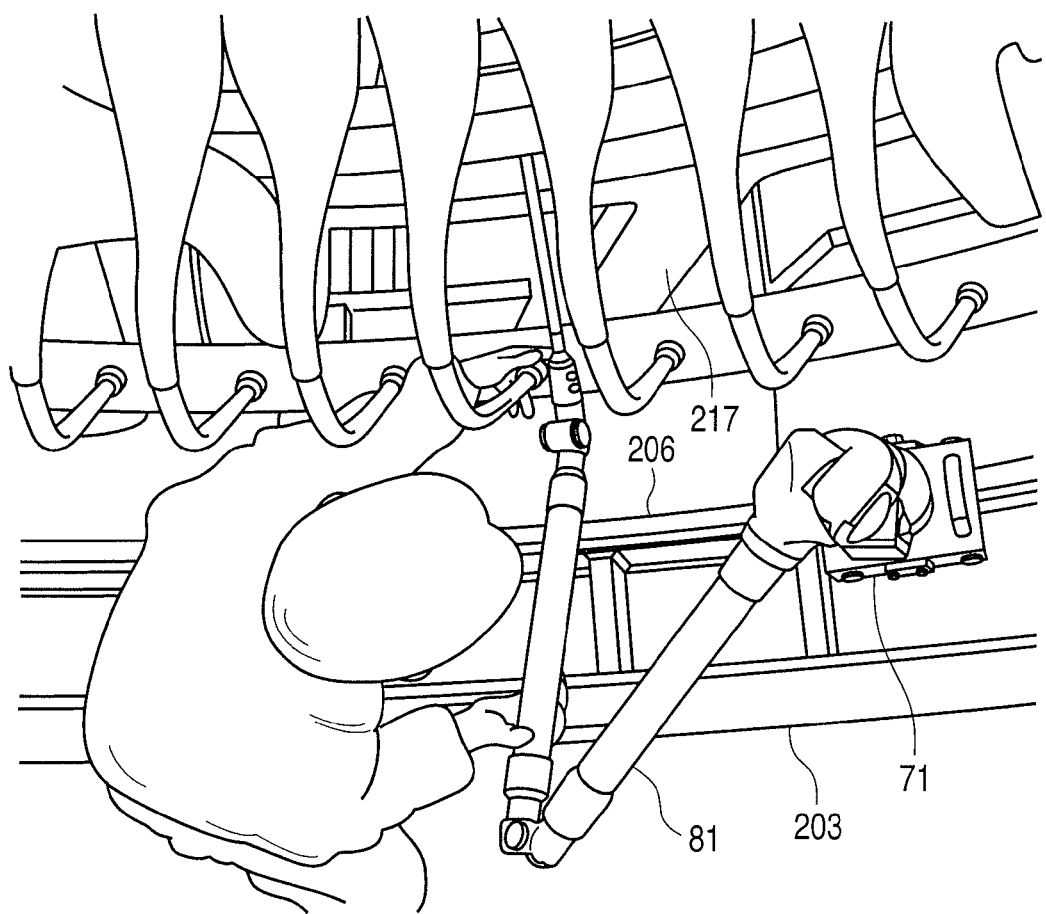
FIG. 11 illustrates a second measurement example by a multi-joint contact three-dimensional shape measurement device secured to an inner diameter surface of the end-shield mounting plate using a clamping jig according to the embodiment.
Figure 12:
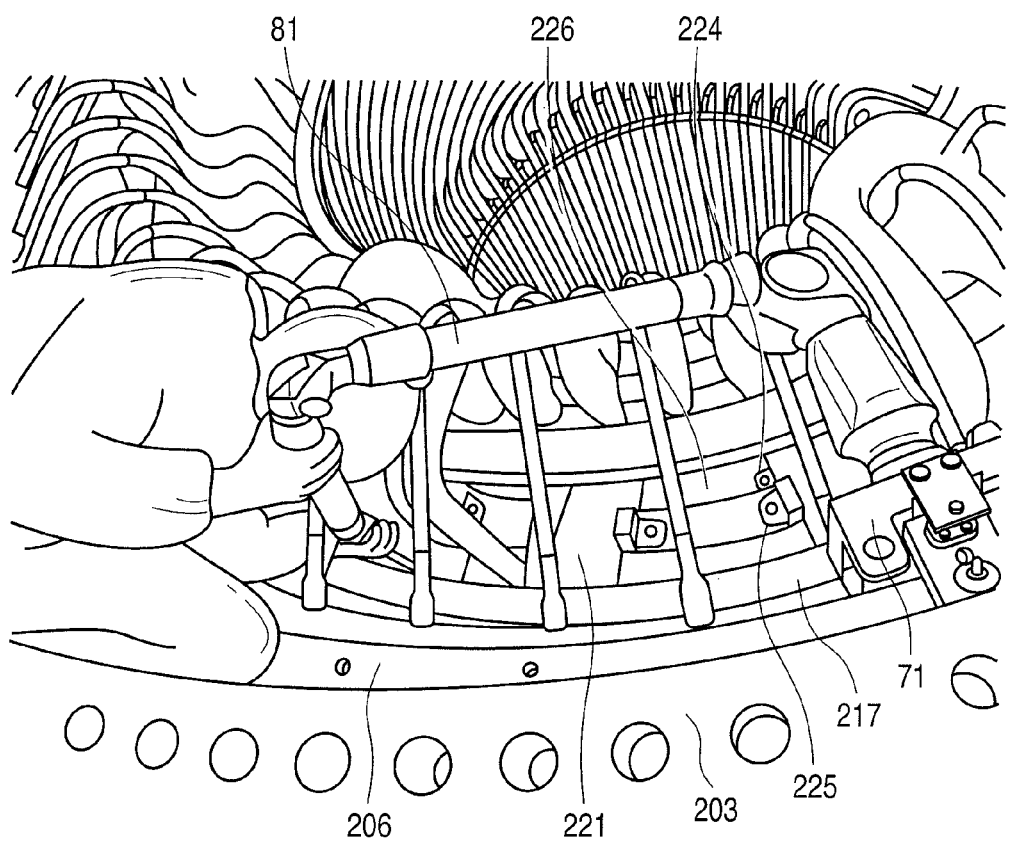
FIG. 12 illustrates a third measurement example by a multi-joint contact three-dimensional shape measurement device secured to an inner diameter surface of the end-shield mounting plate using a clamping jig according to the embodiment.

FIGS. 10 to 12 illustrate a measurement example of measurement range B measured by the multi-joint contact three-dimensional shape measurement device 81, which is secured to the inner diameter surface of the end-shield mounting plate 206 by attaching the clamping jig 71 (as shown in FIG. 3).

The multi-joint contact three-dimensional shape measurement device 81, shown in FIGS. 10 to 12, mainly measures an area such as the bind ring support 221 and the bind-ring-support mounting bolts 224, 225, a connection copper ring/bar 217 of the lower portion of the coil end, and various lower structures of the coil end, and the measured data is stored in a memory, not shown.

In this case, as shown in the drawing associated with "S12" in FIG. 19, a standard coordinate system and a common element are taken by assuming a predetermined portion on the end plate 203 or the end-shield mounting plate 206 as a diameter center and predetermined portions on the bind ring support 221, the shield plate 226, the partition plate 207, and the like as a three-dimensional axis.

Needless to say, the securing by the clamping jig can be performed on plates other than the end-shield mounting plate 206.

Step S13 is a measurement step from the inner diameter surface of the stator core. More specifically, step S13 is performed as will be described below.

Figure 14:
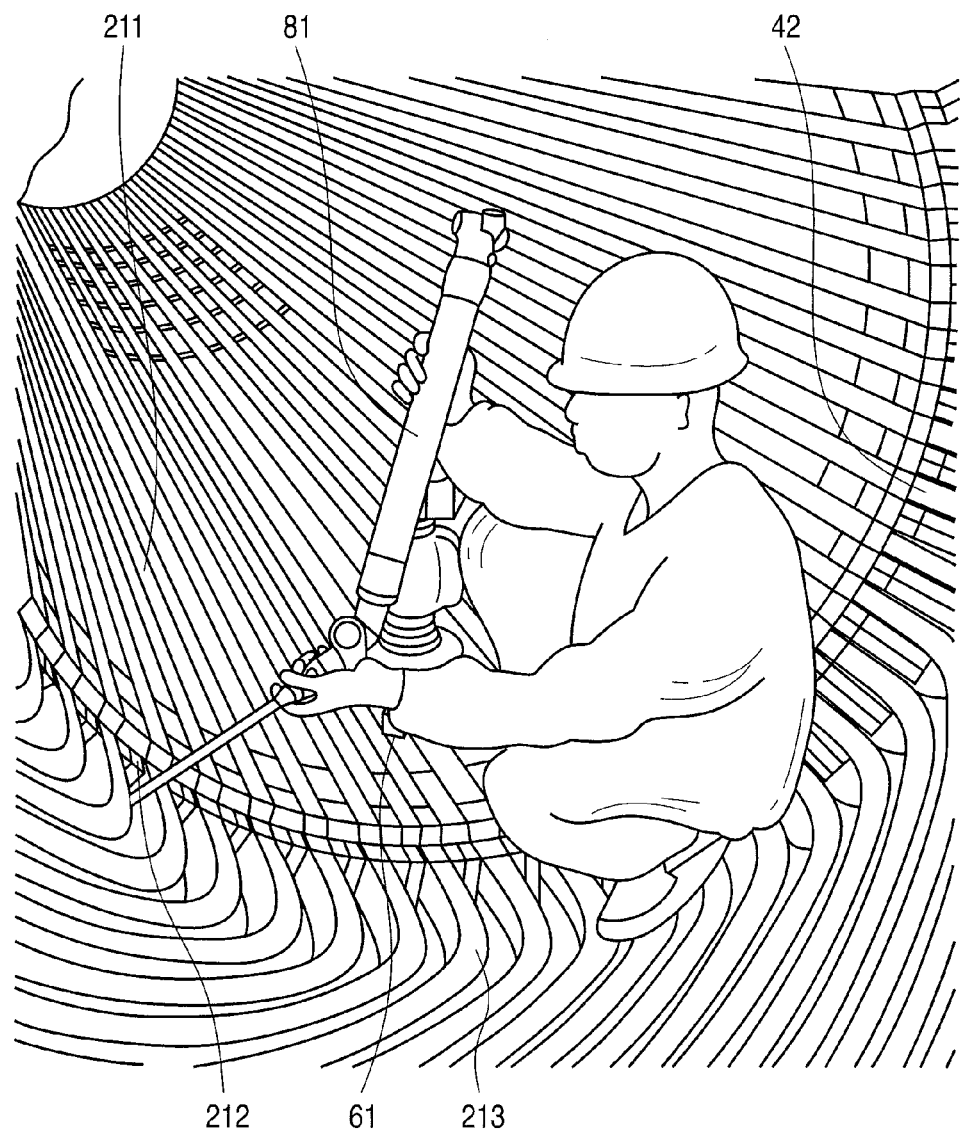
FIG. 14 illustrates a second measurement example by a multi-joint contact three-dimensional shape measurement device secured to an inner diameter surface of a stator core using a magnet jig according to the embodiment.
Figure 15:
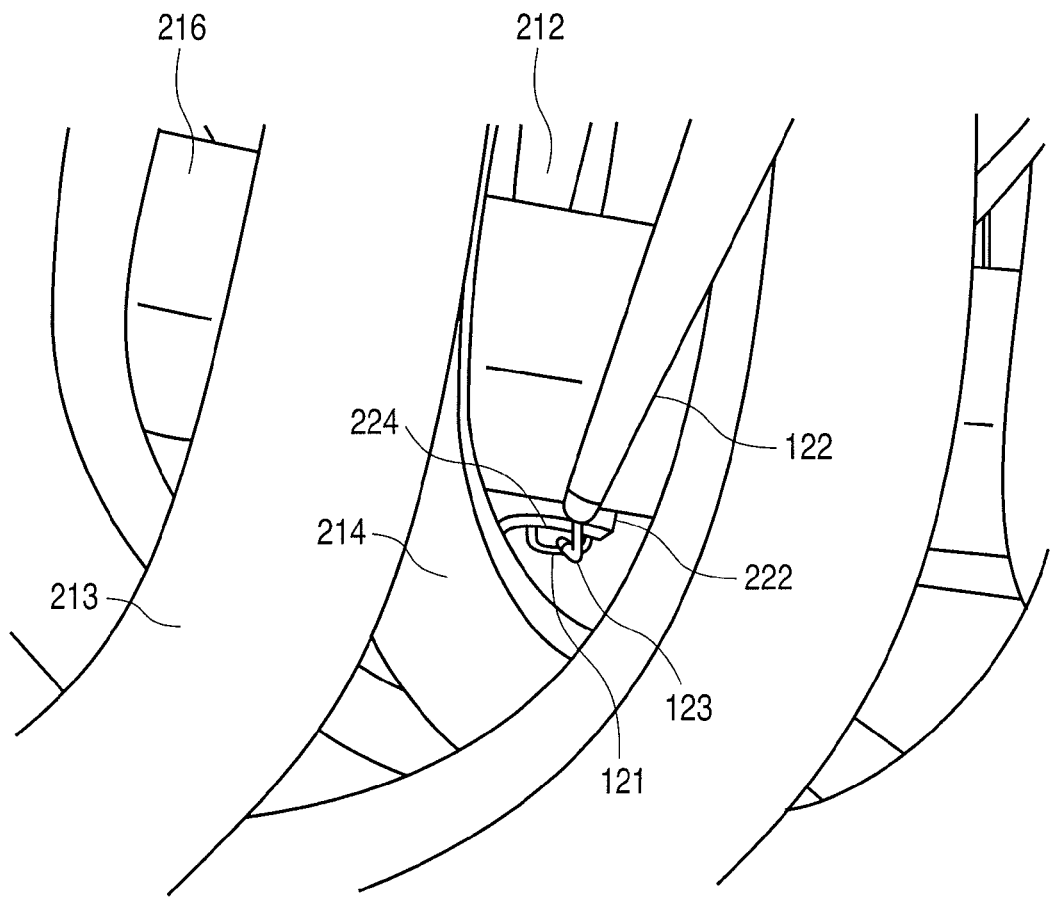
FIG. 15 illustrates a third measurement example by a multi-joint contact three-dimensional shape measurement device secured to an inner diameter surface of a stator core using a magnet jig according to the embodiment.

FIGS. 13 to 15 illustrate a measurement example of measurement range C measured by the multi-joint contact three-dimensional shape measurement device 81, which is secured to the inner diameter surface of the stator core 211 by attaching the magnet jig 61 (as shown in FIG. 2).

In FIGS. 13 to 15, the multi-joint contact three-dimensional shape measurement device 81 mainly measures arrangements of the coil slots in the coil core end 42 (measurement of both sides of the upper coil 213), an arrangement of the bind-ring-support mounting bolt (inside) 224, and angles of the upper coil, and the measured data is stored in a memory, not shown. FIG. 15 is a measurement example of the bind-ring-support mounting bolt (inside).

In this case, as shown in the drawing associated with "S13" in FIG. 19, a standard coordinate system and a common element are taken by assuming a predetermined portion on the stator core 211 as a diameter center and predetermined portions on the outer space block 212, the bind ring support 221, the shield plate 226, and the like as a three-dimensional axis.

Figure 16:
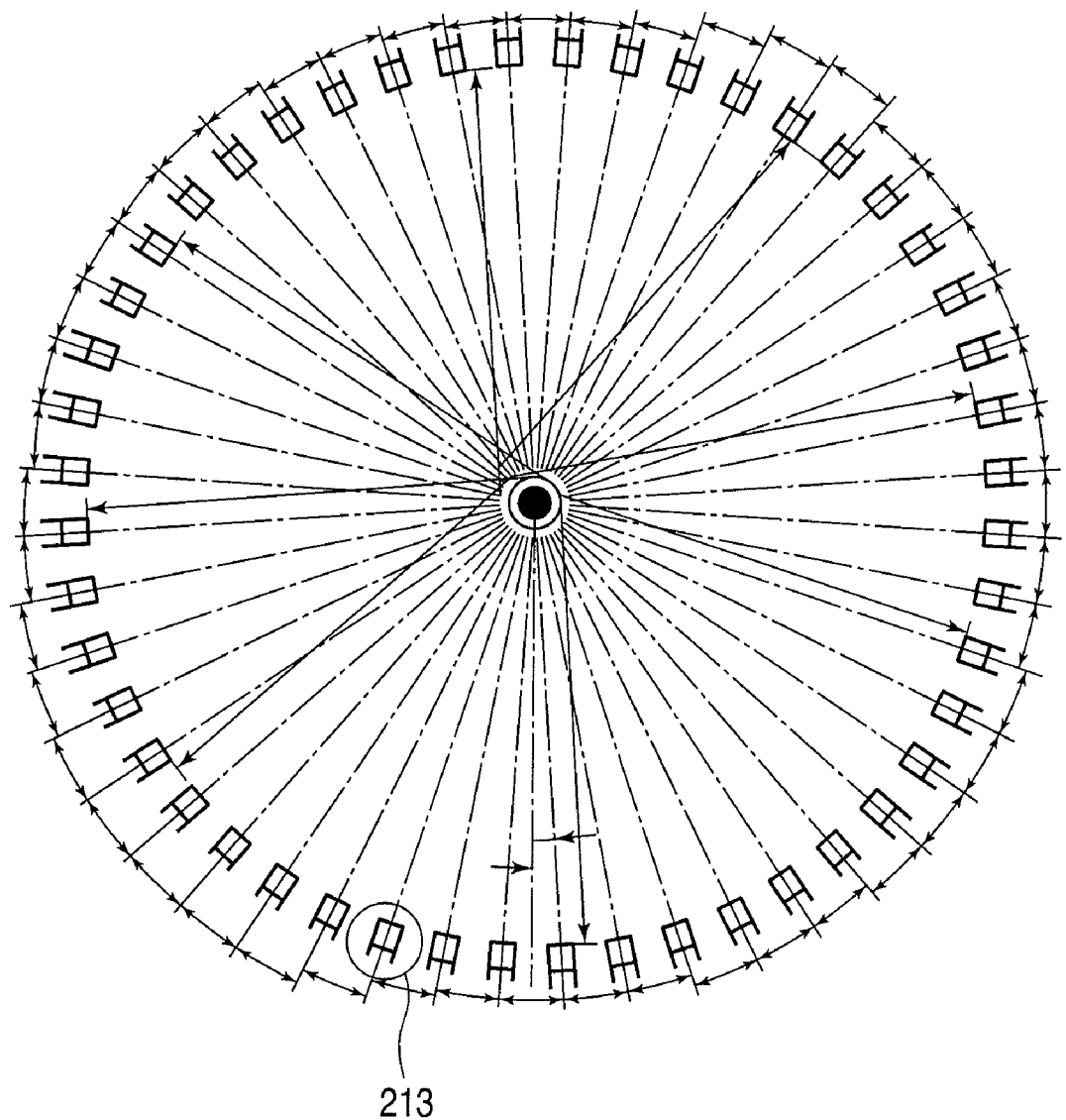
FIG. 16 illustrates a shape measurement data example of an arrangement of a coil slot by a multi-joint contact three-dimensional shape measurement device according to the embodiment.

FIG. 16 illustrates an example of shape measurement data of an arrangement of a coil slot by the above-described measurement shown in FIG. 13. The shape measurement data can be obtained by measuring both sides, for example, of the upper coil 213 of the coil core end part.

Figure 17:
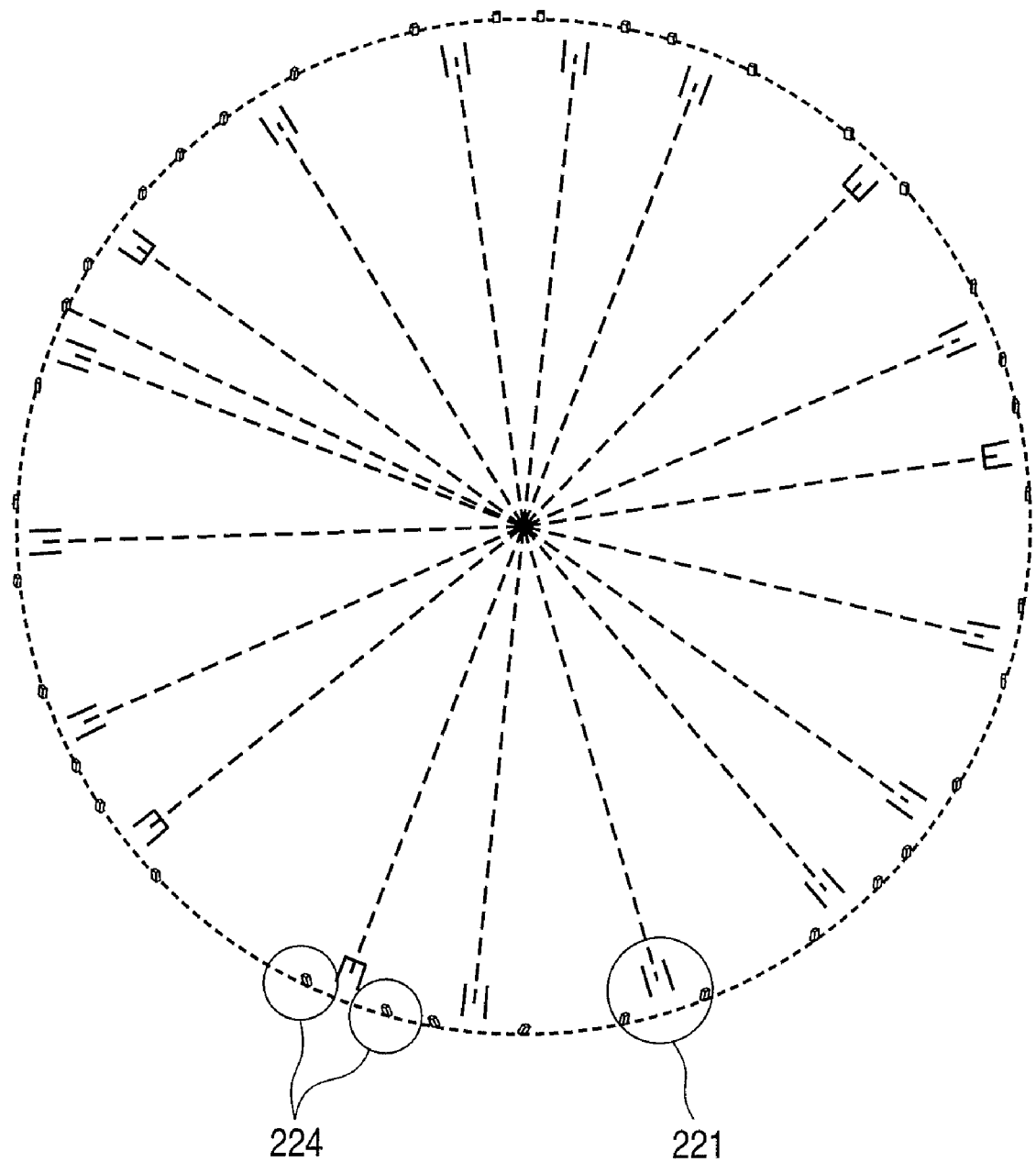
FIG. 17 illustrates a shape measurement data example of an arrangement of a bind ring support and a bind-ring-support mounting bolt according to the multi-joint contact three-dimensional shape measurement device of the present embodiment.

FIG. 17 illustrates an example of shape measurement data of an arrangement of the bind ring support 221 and the bind-ring-support mounting bolt (inside) 224 according to the above-described measurement shown in FIG. 13. The shape measurement data can be obtained by measuring both sides of the bind-ring-support mounting bolt (inside) 224 and more than one sides of a hexagonal portion of the bind-ring-support mounting bolt (inside) 224.

Step S14 is a measurement step from an upper reinforcing part of the bottom plate of the terminal box (non-magnetic body). More specifically, step S14 is performed as will be described below.

Figure 18:
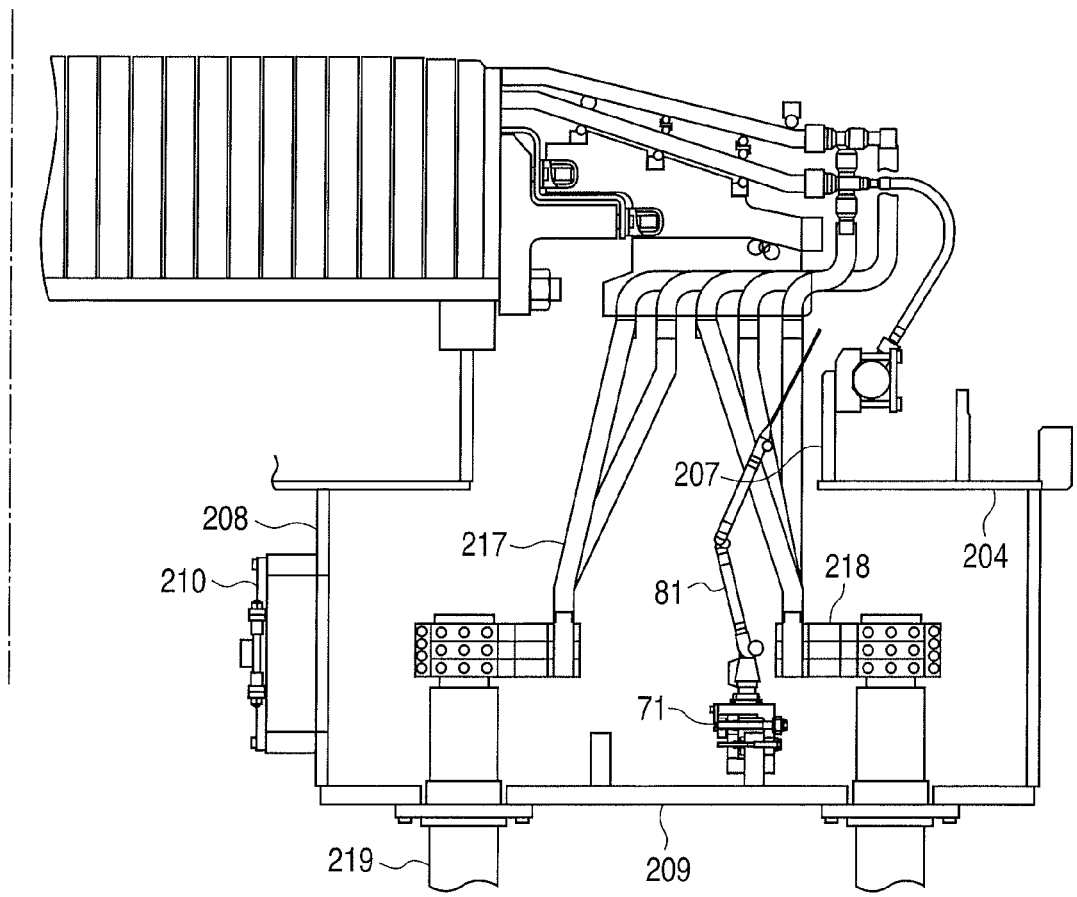
FIG. 18 illustrates a second measurement example by a multi-joint contact three-dimensional shape measurement device secured to a reinforcing portion of a bottom plate of a terminal box using a clamping jig, according to the present embodiment.

FIG. 18 illustrates a measurement example of measurement range D, in which the multi-joint contact three-dimensional shape measurement device 81, to which the clamping jig 71 (as shown in FIG. 3) is attached, is placed into the terminal box 208 from the manhole 210, and secured to the upper part reinforcement of the terminal box bottom plate (non-magnetic body) 209.

The multi-joint contact three-dimensional shape measurement device 81 shown in FIG. 18 mainly measures arrangements of an area such as the connection copper ring/bar 217, the bushing connector 218, and the high voltage bushing 219, and the measured data is stored in a memory, not shown.

In this case, as shown in the drawing associated with "S14" in FIG. 19, a standard coordinate system and a common element are taken by assuming a predetermined portion on the outer peripheral plate 204 as a diameter center and predetermined portions on the partition plate 207, the terminal box bottom plate 209, and the like as a three-dimensional axis.

Step S15 shown in FIG. 5 is a synthesis step of incorporating the shape measurement data of each of measurement ranges B, C, and D of the connection assembly of the stator coil measured in steps S12, S13, and S14, synthesizing the incorporated data on CAD based on the standard coordinate system and the common element, and combining the synthesized data into one item of shape data for the multi-joint contact three-dimensional shape measurement device. That is, as shown in the drawing associated with "S15=S12++S14" in FIG. 19, the shape measurement data of each of (i) measurement range B of the area mainly from the end plate to the lower portion of the coil end of the stator coil connection assembly, obtained by the multi-joint contact three-dimensional shape measurement device (step S12); (ii) measurement range C of the area mainly from the stator core to the lower portion of the coil end of the stator coil assembly (step S13); and (iii) measurement range D of an area mainly from the terminal box to the lower portion of the coil end of the connection assembly of the stator coil (step S14) are obtained as coordinate information. The obtained coordinate information is synthesized on CAD based on the standard coordinate system and the common element in step S15, and is combined into one item of shape data for the multi-joint contact three-dimensional shape measurement device.

Step S16 is a step of integrally synthesizing three-dimensional CAD data obtained by converting point group data of measurement range A measured by the laser non-contact three-dimensional shape measurement device in measurement step S11, and the three-dimensional CAD data of the shape measurement data of each of measurement ranges B, C, and D measured by the multi-joint contact three-dimensional shape measurement device and synthesized in synthesis step S15, by also adding shape data of local areas manually measured in step S17.

In step S18, a plan of the connection assembly of the whole stator coil is created based on the CAD data synthesized in synthesis step S16.

Thus, in the embodiment of the present invention, a stator coil, including the upper coil 213 and the lower coil 214, is contained in a slot provided in the stator core 211 to penetrate the stator core 211 in the axial direction, and the terminal box 208 is provided in correspondence with the coil end of the stator coil. Further, the measurement of a three-dimensional shape of a stator coil connection assembly in a turbine generator including the header casing pipe 216 connected to the coil end, the end-shield mounting plate 206 for attaching the end shield, and the end plate 203 for attaching the bearing bracket 202, which are attached to the outer peripheral plate 204 of a stator frame forming the terminal box, includes the following steps: step S11 of measuring a three-dimensional shape of parts which are viewable directly from outside the connection assembly of the stator coil in the measurement range set in advance by the laser non-contact three-dimensional shape measurement device 41; step S12 of measuring a three-dimensional shape of a range mainly from the end plate 203 to the lower portion of the coil end by securing the multi-joint contact three-dimensional shape measurement device 81, to which a plurality of arms are coupled via a joint including a built-in encoder for detecting the rotation position, to the inner diameter surface of the outer peripheral plate 204 with the magnet jig 61, or to the end-shield mounting plate 206 with the clamping jig 71; step S13 of measuring a three-dimensional shape of the range mainly from the stator core 211 to the lower portion of the coil end by securing the multi-joint contact three-dimensional shape measurement device 81 to the inner diameter surface of the stator core 211 with the magnet jig 61; step S14 of measuring a three-dimensional shape of the range mainly from the terminal box 208 to the lower portion of the coil end by securing the multi-joint contact three-dimensional shape measurement device 81 to the upper reinforcing portion of the terminal box bottom plate 209 with the clamping jig 71; step S15 of synthesizing the shape measurement data of the stator coil connection assembly measured in each of steps S12, S13, and S14 on CAD as one item of shape measurement data based on the standard coordinate system and the common element; step S17 of integrally synthesizing the three-dimensional shape data measured in step S11, the three-dimensional shape data synthesized in step S15, and the shape measurement data of local areas measured manually; and step S18 of drafting an engineering drawing of the whole stator coil connection assembly based on the data integrally synthesized in step S17.

Accordingly, according to the above-described three-dimensional shape measurement method of a connection assembly of a stator coil in a turbine generator, the laser non-contact three-dimensional shape measurement device 41 can grasp the overall structure with slightly coarse precision, although the measurement range is limited to an area which is viewable directly from outside the stator coil connection. Further, since the multi-joint contact three-dimensional shape measurement device 81 can be firmly secured so that the coordinate origin is not misaligned during the measurement by attaching exclusive jigs 61, 71 of a magnet type or clamping type, for example, the surface shape of parts which are difficult to physically access from the inside of the stator coil connection assembly, such as the lower portion of the coil end, can be measured with ease and with high precision. Furthermore, by changing the position where the measurement device is secured, the measurement can be performed from various internal positions, such as the inner diameter surface of the outer peripheral plate 204 (inner diameter surface of the end-shield mounting plate 206), the inner diameter surface of the stator core 211, and the upper reinforcing portion of the terminal box bottom plate 209, and such shape measurement data can also be synthesized later on CAD based on the standard coordinate system and the common element. Moreover, by integrally synthesizing the shape measurement data obtained according to the purpose, a plan can be drafted from an actual product.

As described above, according to the present invention, by using both the laser non-contact three-dimensional shape measurement device capable of obtaining coordinate information on the surface shape of a connection assembly of a stator coil in a CAD data format, and the multi-joint contact three-dimensional shape measurement device, it is possible to obtain a method of measuring a three-dimensional shape of a stator coil connection assembly in a turbine generator capable of measuring a surface shape with ease and with high precision, and a jig for a three-dimensional shape measurement device used in this method.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of measuring a three-dimensional shape of a connection assembly of a stator coil in a turbine generator, the turbine generator including: the stator coil contained in a slot provided in a stator core and penetrating the stator core in an axial direction; a terminal box provided in correspondence with a coil end portion of the stator coil; a header casing pipe connected to the coil end; a mounting plate configured to mount an end shield; and an end plate configured to mount a bearing bracket, the header casing pipe, the mounting plate, and the end plate being mounted on an outer peripheral plate of a stator frame forming the terminal box, the method comprising:

first measuring a three-dimensional shape of a measurement area of the connection assembly of the stator coil in a measurement range set in advance by a laser non-contact three-dimensional shape measurement device;

second measuring a three-dimensional shape of a measurement area of the connection assembly of the stator coil in a measurement range set in advance by a multi-joint contact three-dimensional shape measurement device, the multi-joint contact three-dimensional shape measurement device including a plurality of arms being coupled via a joint including a built-in encoder; and integrally synthesizing the three-dimensional shape data measured in the first measurement, the three-dimensional shape data measured in the second measurement, and shape measurement data of a local area measured manually, thereby drafting a plan of the stator connection assembly.

2. The method according to claim 1, wherein the measurement range measured by the laser non-contact three-dimensional shape measurement device in the first measurement is an area viewable directly from outside the stator coil connection assembly.

3. The method according to claim 1, wherein the measurement of the connection assembly of the stator coil in the measurement range measured by the multi-joint contact three-dimensional shape measurement device in the second measurement is performed mainly over a range from the end plate to a lower portion of the coil end, by securing the multi-joint contact three-dimensional shape measurement device with a magnet jig to an inner diameter surface of the outer peripheral plate or a clamping jig to the end-shield mounting plate.

4. The method according to claim 3, wherein the integrally synthesizing the three-dimensional shape data includes combining the shape measurement data of the connection assembly of the stator coil in each of the measurement ranges measured by the multi-joint contact three-dimensional shape measurement device in the second measurement into one item of shape measurement data based on a standard coordinate system and a common element.

5. A magnet jig used in the method according to claim 3, the magnet jig comprising:
   a mount ring screwed on a screw part of a secured end of the multi-joint contact three-dimensional shape measurement device, the mount ring being provided on an upper surface of a pedestal; and
   a plurality of magnet bases configured to adsorb the inner diameter surface of the outer peripheral plate or the inner diameter surface of the stator core, the plurality of magnet bases being attached at certain intervals via a movable ball joint on a lower surface of the pedestal.

6. A clamping jig used in the method according to claim 3, the clamping jig comprising:
   a mount ring screwed on a screw part of a secured end of the multi-joint contact three-dimensional shape measurement device, the mount ring being provided on an upper surface plate of a main body including a front surface plate and the upper surface plate,
   wherein the clamping jig threads into a clamp screw inserted into a screw aperture provided in an upper portion of a back plate provided at a rear space portion facing the front plate of the main body to penetrate the front plate, the clamp screw allows the back plate to move in parallel in a direction toward or away from the front plate, and the back plate and the front plate clamp the end-shield mounting plate or the upper reinforcing portion of the bottom plate of the terminal box.

7. The method according to claim 1, wherein the measurement of the connection assembly of the stator coil in the measurement range measured by the multi joint contact three-dimensional shape measurement device in the second measurement is performed mainly over a range from the stator core to a lower portion of the coil end, by securing the multi-joint contact three-dimensional shape measurement device to the inner diameter surface of the stator core with a magnet jig.

8. The method according to claim 7, wherein the integrally synthesizing the three-dimensional shape data includes combining the shape measurement data of the connection assembly of the stator coil in each of the measurement ranges measured by the multi-joint contact three-dimensional shape measurement device in the second measurement into one item of shape measurement data based on a standard coordinate system and a common element.

9. A magnet jig used in the method according to claim 7, the magnet jig comprising:
   a mount ring screwed on a screw part of a secured end of the multi-joint contact three-dimensional shape measurement device, the mount ring being provided on an upper surface of a pedestal; and
   a plurality of magnet bases configured to adsorb the inner diameter surface of the outer peripheral plate or the inner diameter surface of the stator core, the plurality of magnet bases being attached at certain intervals via a movable ball joint on a lower surface of the pedestal.

10. The method according to claim 1, wherein the measurement of the connection assembly of the stator coil in the measurement range measured by the multi-joint contact three-dimensional shape measurement device in the second measurement is performed mainly over a range from the terminal box to a lower portion of the coil end, by securing the multi-joint contact three-dimensional shape measurement device to an upper reinforcing portion of a bottom plate of the terminal box with a clamping jig.

11. The method according to claim 10, wherein the integrally synthesizing the three-dimensional shape data includes combining the shape measurement data of the connection assembly of the stator coil in each of the measurement ranges measured by the multi-joint contact three-dimensional shape measurement device in the second measurement into one item of shape measurement data based on a standard coordinate system and a common element.

12. A clamping jig used in the method according to claim 10, the clamping jig comprising:
   a mount ring screwed on a screw part of a secured end of the multi-joint contact three-dimensional shape measurement device, the mount ring being provided on an upper surface plate of a main body including a front surface plate and the upper surface plate,
   wherein the clamping jig threads into a clamp screw inserted into a screw aperture provided in an upper portion of a back plate provided at a rear space portion facing the front plate of the main body to penetrate the front plate, the clamp screw allows the back plate to move in parallel in a direction toward or away from the front plate, and the back plate and the front plate clamp the end-shield mounting plate or the upper reinforcing portion of the bottom plate of the terminal box.

* * * * *